(12) United States Patent
Bahe et al.

(10) Patent No.: US 12,501,905 B2
(45) Date of Patent: Dec. 23, 2025

(54) DOUGH-BASED FOOD PRODUCT AND METHOD OF PREPARING

(71) Applicant: General Mills, Inc., Minneapolis, MN (US)

(72) Inventors: Kristi L Bahe, Coon Rapids, MN (US); Steven J Cox, Long Lake, MN (US); Jeremy B Thomspon, Hopkins, MN (US)

(73) Assignee: General Mills, Inc., Minneapolis, MN (US)

( * ) Notice: Subject to any disclaimer, the term of this patent is extended or adjusted under 35 U.S.C. 154(b) by 594 days.

(21) Appl. No.: 16/086,834

(22) PCT Filed: Mar. 24, 2016

(86) PCT No.: PCT/US2016/023900
§ 371 (c)(1),
(2) Date: Sep. 20, 2018

(87) PCT Pub. No.: WO2017/164875
PCT Pub. Date: Sep. 28, 2017

(65) Prior Publication Data
US 2019/0098906 A1 Apr. 4, 2019

(51) Int. Cl.
*A21D 10/02* (2006.01)
*A21D 2/02* (2006.01)
(Continued)

(52) U.S. Cl.
CPC ............ *A21D 10/025* (2013.01); *A21D 2/02* (2013.01); *A21D 2/08* (2013.01); *A21D 6/00* (2013.01);
(Continued)

(58) Field of Classification Search
CPC ... A21D 2/02; A21D 2/08; A21D 6/00; A21D 10/025; A21D 13/06; A21D 13/41;
(Continued)

(56) References Cited

U.S. PATENT DOCUMENTS 2,412,154 A * 12/1946 Jackson ................ A21D 2/02
426/21
3,758,311 A  9/1973 Fortmann
(Continued)

FOREIGN PATENT DOCUMENTS

WO  WO 2012/126035  9/2012
WO  WO 2015/028784  3/2015

OTHER PUBLICATIONS

Noort et al. "Saltiness enhancement by taste contrast in bread prepared with encapsulated salt", published online Dec. 24, 2011, https://www.sciencedirect.com/science/article/pii/S0733521011002256 (Year: 2011).*
(Continued)

*Primary Examiner* — Erik Kashnikow
*Assistant Examiner* — Bryan Kim
(74) *Attorney, Agent, or Firm* — Jordan IP Law, LLC; Tina Yin Sowatzke, Esq.

(57) ABSTRACT

A dough- or batter-based food product is prepared by mixing dough or batter ingredients to establish a dough or batter composition, the dough ingredients including at least flour, water and salt. The salt particles have dissolution rate of at least 120 seconds. Batter or dough provided herein, and cooked foods made from the batter or dough, include pockets of salt at a higher concentration than the dough, batter, or cooked food overall. Batter- or dough-based food products provided have a saltiness perception level substantially the same as compared to batter- or dough-based food products that include table salt in an amount at least 40%

(Continued)

greater than the provided batter- or dough-based food product.

13 Claims, 4 Drawing Sheets

(51) Int. Cl.
    *A21D 2/08*       (2006.01)
    *A21D 6/00*       (2006.01)
    *A21D 13/06*      (2017.01)
    *A21D 13/41*      (2017.01)
    *A21D 13/44*      (2017.01)
    *A23L 27/00*      (2016.01)
    *A23L 27/40*      (2016.01)
    *A21D 13/80*      (2017.01)

(52) U.S. Cl.
    CPC ............ *A21D 13/06* (2013.01); *A21D 13/41* (2017.01); *A21D 13/44* (2017.01); *A23L 27/40* (2016.08); *A23L 27/70* (2016.08); *A21D 13/80* (2017.01); *A23V 2002/00* (2013.01); *A23V 2200/00* (2013.01); *A23V 2200/326* (2013.01)

(58) Field of Classification Search
    CPC ......... A21D 13/44; A21D 13/80; A23L 27/40; A23L 27/70; A23L 27/00; A23L 27/72; A23L 27/88; A23L 29/00; A23L 29/015; A23P 20/00; A23P 20/10; A23P 20/11; A23P 20/15; A23P 20/18
    See application file for complete search history.

(56) References Cited

U.S. PATENT DOCUMENTS

| | | | |
|---|---|---|---|
| 4,988,521 A | 1/1991 | Fan | |
| 6,017,573 A | 1/2000 | Baker et al. | |
| 6,589,583 B1* | 7/2003 | Hansen | A21D 10/02 426/551 |
| 7,923,047 B2 | 4/2011 | Jensen et al. | |
| 2004/0241283 A1* | 12/2004 | Domingues | A21D 6/001 426/18 |
| 2007/0184167 A1* | 8/2007 | Hurst | A21D 10/002 426/549 |
| 2008/0003339 A1 | 1/2008 | Johnson et al. | |
| 2008/0038411 A1 | 2/2008 | Jensen et al. | |
| 2008/0075813 A1* | 3/2008 | Smith | A23C 19/09 426/99 |
| 2009/0104330 A1 | 4/2009 | Zasypkin | |
| 2009/0226591 A1 | 9/2009 | Frazee | |
| 2010/0104733 A1* | 4/2010 | Busch | A23L 13/10 426/649 |
| 2011/0045157 A1* | 2/2011 | Stieger | A23L 13/428 426/549 |
| 2011/0097449 A1 | 4/2011 | Jensen et al. | |
| 2011/0098365 A1 | 4/2011 | Minter et al. | |
| 2011/0116342 A1 | 5/2011 | Dennen et al. | |
| 2015/0050412 A1 | 2/2015 | Erickson et al. | |
| 2015/0056338 A1* | 2/2015 | Chigurupati | A23P 20/11 426/619 |
| 2016/0058060 A1* | 3/2016 | Ramm-Schmidt | A23B 7/157 424/682 |
| 2017/0127710 A1* | 5/2017 | Akashe | A23L 27/40 |

OTHER PUBLICATIONS

Red Star NPL, published Oct. 24, 2014, https://web.archive.org/web/20141024235024/https://redstaryeast.com/yeast-baking-lessons/postpone-baking/ (Year: 2014).*

Goumetsleuth NPL, published Oct. 5, 2014, https://web.archive.org/web/20141005204403/https://www.gourmetsleuth.com/articles/detail/culinary-salt-guide (Year: 2014).*

Pyler et al., "Bakery Ingredients Part C: Micro Ingredients", Baking Science & Technology, Fourth Edition, vol. I: Fundamentals & Ingredients, Chapter 2, pp. 391-497, 2008.

Moey's Kitchen Foodblog, "*Focaccia mit Rosmarin und Meersalz und Focaccia mit Cherryomaten, Thymian und Meersalz*", Retrieved from the Internet: https://www.moeyskitchen.com/2013/07/zweierfei-focaccia-mit-meersalz-oder.html, Jun. 25, 2020.

Mintel, "*Fresh Croissant Dough*", Retrieved from the Internet: www.gnpd.com, Jun. 25, 2020.

Bake Info NPL, published Oct. 10, 2012, https://web.archive.org/web/20121010002331/https://www.bakeinfo.co.nz/Ask-Us/FAQ/Ingredients/What-is-the-role-of-salt-in-bakery-products—(year: 2012).

Bon Appetit NPL, published Oct. 15, 2013, https://www.bonappetit.com/recipe/salt-and-pepper-biscuits (Year: 2013).

Science of Cooking NPL, published Dec. 23, 2003, https://web.archive.org/web/20031223080039/https://www.exploratiorium.edu/cooking.cooks/10-13-03.html (Year: 2003).

Beck et al., "*Sodium Chloride—Sensory, Preserving and Technological Impact on Yeast-Leavened Products*", International Journal of Food Science and Technology, vol. 47, No. 9, pp. 1798-1807, Sep. 1, 2012.

* cited by examiner

DOUGH-BASED FOOD PRODUCT AND METHOD OF PREPARING

CROSS-REFERENCE TO RELATED APPLICATIONS

The present application represents a National Stage application of PCT/US2016/023900 entitled "Dough-Based Food Product and Method of Preparing", filed Mar. 24, 2016, pending. The entire contents of this application is incorporated herein by reference.

BACKGROUND OF THE INVENTION

Salt has been used for millennia to both flavor and preserve food. In fact, salt is an essential part of the human diet. In view of these benefits, salt is found in a wide variety of products, sometimes in relatively large amounts. Unfortunately, there are downsides to this ubiquity since the consumption of salt, particularly sodium from salt, influences health and it is possible to consume more salt than is ideal. Certainly, in various food items, it would be desirable to reduce the salt content if the flavor benefits could still be maintained.

Various efforts have been made to reduce the salt content of food items while minimizing or eliminating any negative effect on flavor perception or other food properties, such as shelf life. Some methods of reducing salt content include the use of salt replacers to replace some or all of the salt in a food. As used herein, the term "salt replacer" refers to non-sodium salts, such as calcium chloride, or other ingredients, such as herbs or extracts, that mimic or enhance the flavor of salt. Such methods can reduce the overall sodium content of a food while maintaining a salty flavor, but non-sodium salts can impart a metallic or bitter taste, and other salt replacers, such as herbs and extracts, can be expensive and/or impart unwanted flavors as well. In avoiding the unwanted flavor effects of salt replacers, the level of salt reduction achieved using salt replacers may be less than desired, or flavor masking ingredients may be used to cover the unwanted flavor effects, further adding to expense and formulation complexity.

Other methods of reducing sodium content rely on replacing sodium-containing chemical leavening components, such as sodium acid pyrophosphate (SAPP), with alternatives that do not contain sodium, such as calcium acid pyrophosphate (CAPP). However, non-sodium leavening agents can also alter the flavor of foods containing them, and non-sodium leavening systems may not function as well.

SUMMARY OF THE INVENTION

In one embodiment, a method is provided for producing a packaged dough. The packaged dough has a shelf life of at least 14 days at 10° F. and is formulated to produce a baked good when baked. The method includes mixing flour, water, and salt particles that have a dissolution rate of at least 120 seconds to form a dough having at least 10% of the salt particles being at least partially undissolved; forming the dough into pieces; and packaging the dough.

In some embodiments, the dough pieces can be frozen.

In some embodiments, the baked good is a biscuit or scone. In some embodiments, the baked good is a bread, pizza crust, dinner roll, or sweet roll.

In some embodiments, the baked good has a saltiness perception level substantially the same as compared to a first control baked good produced from a first control dough having the same formulation as the packaged dough, with the exception of the first control dough having salt particles with a dissolution rate of 100 seconds or less and containing at least 40% more salt particles by weight than the packaged dough.

In another embodiment, a method is provided for producing a packaged dough. The packaged dough has a shelf life of at least 14 days at 10° F. and is formulated to produce a baked good when baked. The method includes mixing flour, water, and salt particles that have a dissolution rate of at least 120 seconds to form a dough having dissolved salt that is non-homogeneously distributed throughout the dough; forming the dough into pieces; and packaging the dough.

In some embodiments, the dough pieces can be frozen.

In some embodiments, the baked good is a biscuit or scone. In some embodiments, the baked good is a bread, pizza crust, dinner roll, or sweet roll.

In some embodiments, the baked good has a saltiness perception level substantially the same as compared to a first control baked good produced from a first control dough having the same formulation as the packaged dough, with the exception of the first control dough having salt particles with a dissolution rate of 100 seconds or less and containing at least 40% more salt particles by weight than the packaged dough.

In an embodiment, a method of producing a packaged, cooked batter- or dough-based food product is provided. The method includes mixing flour, water, and salt particles that have a dissolution rate of at least 120 seconds to form a dough or batter having at least 10% of the salt particles being at least partially undissolved; at least partially cooking the dough or batter to make a cooked batter- or dough-based food product; and packaging the cooked batter- or dough-based food product.

In some embodiments, the cooked batter- or dough-based food product is a pancake, cake, muffin, bread, pizza crust, dinner roll, or sweet roll.

In some embodiments, the cooked batter- or dough-based food product has a saltiness perception level substantially the same as compared to a first control cooked batter- or dough-based food product produced from a first control dough or batter having the same formulation as the packaged cooked batter- or dough-based food product, with the exception of the first control dough or batter having salt particles with a dissolution rate of 100 seconds or less and containing at least 40% more salt particles by weight than the packaged cooked batter- or dough-based food product.

In another embodiment, a method of producing a packaged, cooked batter- or dough-based food product, where the method includes mixing flour, water, and salt particles that have a dissolution rate of at least 120 seconds to form a dough or batter having dissolved salt that is non-homogeneously distributed throughout the dough; at least partially cooking the dough or batter to make a cooked batter- or dough-based food product; and packaging the cooked batter- or dough-based food product.

In some embodiments, the cooked batter- or dough-based food product is a pancake, cake, muffin, bread, pizza crust, dinner roll, or sweet roll.

In some embodiments, the cooked batter- or dough-based food product has a saltiness perception level substantially the same as compared to a first control cooked batter- or dough-based food product produced from a first control dough or batter having the same formulation as the packaged cooked batter- or dough-based food product, with the exception of the first control dough or batter having salt particles with a dissolution rate of 100 seconds or less and containing at least 40% more salt particles by weight than the packaged cooked batter- or dough-based food product.

In an embodiment, a food product is provided. The food product includes a packaged dough having a shelf life of at least 14 days at 10° F. and formulated to produce a baked good when baked. The packaged dough includes a flour, water, and salt particles that have a dissolution rate of at least 120 seconds. In some embodiments, the baked good has dissolved salt that is non-homogeneously distributed throughout the dough. In some embodiments, the baked good has a saltiness perception level substantially the same as compared to a first control baked good produced from a first control dough having the same formulation as the packaged dough, with the exception of the first control dough having salt particles with a dissolution rate of 100 seconds or less and containing at least 40% more salt particles by weight than the packaged dough.

In some embodiments, the packaged dough can have an improved shelf life characteristic at a temperature of 10° F. over the first control dough.

In some embodiments, the salt particles in the packaged dough can have an average particle size of at least 500 microns, or at least 1000 microns.

In some embodiments, the salt particles in the packaged dough are encapsulated.

In some embodiments, the packaged dough is formulated to produce a biscuit or scone. In some embodiments, the packaged dough is formulated to produce a bread or a roll.

In an embodiment, a packaged, cooked batter- or dough-based food product including flour, water, and salt is provided, where the packaged, cooked batter- or dough-based food product has dissolved salt that is non-homogeneously distributed throughout.

In some embodiments, the cooked batter- or dough-based food product is a pancake, cake, muffin, or cupcake. In some embodiments, the cooked batter- or dough-based food product is a biscuit or scone. In some embodiments, the cooked batter- or dough-based food product is a bread, pizza crust, dinner roll, or sweet roll.

In some embodiments, the packaged, cooked batter- or dough-based food product has a saltiness perception level substantially the same as compared to a control baked good having at least 40% more salt by weight than the packaged, cooked batter- or dough-based food product.

In an embodiment, a packaged, cooked batter- or dough-based food product including flour, water, and salt, where the packaged, cooked batter- or dough-based food product has a saltiness perception level substantially the same as compared to a control baked good having at least 40% more salt by weight than the packaged, cooked batter- or dough-based food product.

In some embodiments, the cooked batter- or dough-based food product has a saltiness perception level substantially the same as compared to a control baked good having at least 100% more salt by weight than the packaged, cooked batter- or dough-based food product.

In some embodiments, the cooked batter- or dough-based food product has a saltiness perception level substantially the same as compared to a control baked good having at least 200% more salt by weight than the packaged, cooked batter- or dough-based food product.

In some embodiments, the cooked batter- or dough-based food product is a pancake, cake, muffin, or cupcake. In some embodiments, the cooked batter- or dough-based food product is a biscuit or scone. In some embodiments, the cooked batter- or dough-based food product is a bread, pizza crust, dinner roll, or sweet roll.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION

Figure 1:
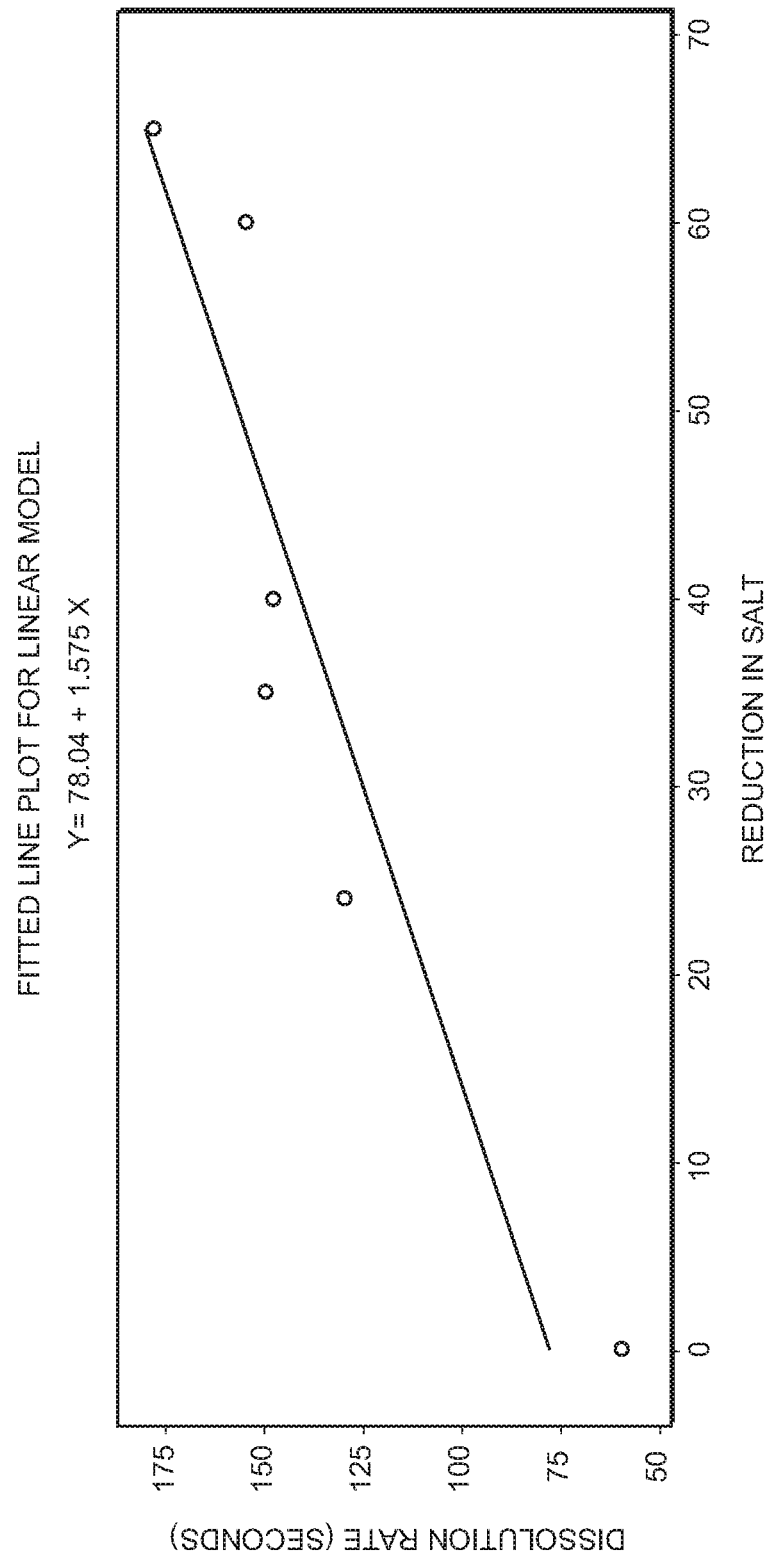
FIG. 1 is a graph of the relationship between dissolution rate of a salt and salt content reduction.

While an important ingredient for flavor enhancement and preservation of foods, excess salt consumption, particularly the consumption of sodium from salt, can result in negative health consequences. As used herein, the term "salt" refers to sodium chloride-based salts. Generally, such salts include 97-99% sodium chloride in the case of table salt and about 84% sodium chloride in the case of sea salt.

Various dough- or batter-based food items include salt in order to provide a pleasant flavor. However, because dough- or batter-based food items can also contain sodium from leavening agents, such food items can be a significant source of sodium in the diet. Given the disadvantages of using salt replacers and replacing sodium-containing leavening agents with non-sodium containing leavening agents, it was desired to find an alternative method for reducing salt content in dough- or batter-based food items without sacrificing saltiness perception of the dough- or batter-based food item, and without requiring the use salt replacers.

Typically, doughs and batters are made to include relatively quickly dissolving salts in order to ensure even distribution of salt throughout the dough or batter, and to ensure complete dissolution during mixing. As described in the *American Institute of Baking Research Department Technical Bulletin* on salt selection and use ("Salt Grade Selection for Baking Application", Volume X, Issue 2, February, 1988), "[t]he most important quality parameters for selecting an appropriate dough salt are particle size and dissolving rate . . . Dough Salt should exhibit consistent particle size and dissolving rate and must be cake-free to ensure complete dissolution and dispersion by the end of dough mixing." Poor dispersion and dissolution in a dough or batter were understood to negatively affect flavor, as well as quality of food items made with the dough or batter. Therefore, a salt considered suitable for use in a dough or batter typically had a dissolution rate of 100 seconds or less. As used herein, a salt's dissolution rate is measured as described by Pyler and Gorton (2008). Bakery Ingredients Part C: Micro Ingredients In *Baking Science and Technology, Fourth Edition, Vol. I* (pp. 391-497). Kansas City, Mo.: Sosland Publishing Co. (section 2.C.5. Salt, pp. 427-437). Briefly, a salt's dissolution rate is measured by putting 2.5 g of the salt into 100 ml of water at and agitating vigorously until dissolved 2% NaCl concentration is reached as detected by a sodium ion specific meter. The amount of time required to dissolve 2.0 g of the salt is the dissolution rate.

It was discovered and described herein, however, that a dough- or batter-based food item can be made with at least 30% less salt content (e.g. 30-70% less salt) while retaining a saltiness perception level that is substantially the same by including a salt that does not completely dissolve by the end of mixing of the dough or batter. A dough or batter provided herein comprises particles that have a dissolution rate of at least 120 seconds (e.g., at least 140 seconds or from 120 seconds to 200 seconds). That is, a dough or batter that includes salt particles that have a dissolution rate of at least 120 seconds can be cooked to produce a food item that has a saltiness perception level that is substantially the same as compared to a control food item that contains at least 40% more (e.g., at least 65% more, at least 100% more, or at least 200% more) salt.

As used herein, the term "saltiness perception level" refers to the perception of salty flavor by a person with an average ability to perceive saltiness. Saltiness perception level is considered substantially the same between two food items if a person with an average ability to perceive saltiness cannot perceive a difference in salty flavor between the two food items upon tasting them.

Provided herein are products that benefit from the discovery that a salt that does not fully dissolve in a batter or a dough during mixing can be used to reduce salt content without sacrificing saltiness perception, and methods for making such products. Without being bound to theory, it is believed that salt that does not fully dissolve during mixing dissolves following mixing, before cooking or during cooking, to produce a dough or batter with dissolved salt that is non-homogeneously distributed throughout the dough or batter. Once cooked, pockets that have a higher salt concentration can be found within a food made from the dough. When the tongue encounters the pockets of concentrated salt, it perceives a higher concentration of salt than the overall concentration within the food, making the perceived saltiness substantially the same as a food made with a dough with a higher overall concentration of salt.

Products provided herein include packaged doughs with an extended shelf life (e.g., at least 14 days at 10° F.) and packaged dough- or batter-based food products. As used herein, the terms "dough" and "batter" refer to flour-and-water-based compositions used to make food products. A dough typically contains flour in an amount by weight greater than the amount of water, while a batter typically contains water in an amount by weight greater than the amount of flour. A dough is typically cooked to produce food items such as bread, biscuits, or scones. A batter is typically cooked to produce food items such as pancakes, waffles, cakes, muffins, or cupcakes.

A packaged dough or a packaged dough- or batter-based food product provided herein comprises ingredients, including at least a flour, water, and salt. Any food grade salt having a dissolution rate greater than 120 seconds is suitable for compositions provided herein. Salt is available in a variety of particle forms (e.g., crystals or flakes), particle sizes, and grades suitable for use in food. As used herein, "particle size" refers to the average particle size of a salt type as determined by measuring the largest dimension of the particles. Typically, table salt has an average particle size of roughly 300 microns, while rock salt can have a particle size of more than 700 microns.

Dissolution rate of a salt can depend on a variety of factors including, without limitation, surface area to volume ratio of the salt particles and purity of the salt. Typically, the larger the volume to surface area ratio of salt particles, the higher the dissolution rate. Thus, a flake form salt would generally be expected to have a lower dissolution rate as compared to a crystal form salt with the same particle size.

In some embodiments, a salt can be encapsulated with a material, such as a lipid, a wax, a carbohydrate, or other material, in order to modify the dissolution rate of the salt. For example, a table salt, which typically has a dissolution rate of 50-60 seconds, can be encapsulated with a lipid material in order to increase the dissolution rate to at least 120 seconds. In some embodiments, an encapsulated salt can be formulated to minimally dissolve until it is heated, such as when a dough or batter containing the encapsulated salt is cooked.

Desired dissolution rate can depend on a variety of factors, including for example, water content of the dough or batter, mixing time of the dough or batter, desired saltiness of a product made with the dough or batter, and time between mixing of the dough or batter and cooking of the dough or batter. For example, if water content is relatively high, such as in a batter composition, a higher dissolution rate (e.g., at least 140 seconds) may be desired, or an encapsulated salt with a particularly long dissolution rate or a formulation designed to dissolve during cooking may be desired. In another example, if salt is added early in the mixing process of the dough or batter, a longer dissolution rate (e.g., at least 140 seconds) may be desired, while a shorter dissolution rate (e.g., 120 seconds to about 140 seconds) may be desired if salt is added shortly before mixing is finished.

In some embodiments, a salt can be selected based on the desired salt reduction goal in the final food product. Generally, as the dissolution rate for a salt increases, the greater the salt reduction potential without reducing saltiness of the food item. Of course, if desired, it is possible to provide an even larger reduction in salt content if it is acceptable for the salty flavor perception to be decreased. For example, this may be acceptable in a food item marketed as being "low sodium". In other embodiments, a lower reduction in salt content can be achieved by replacing only a portion of the table salt typically used with a salt having a dissolution rate greater than 120 seconds.

In terms of total salt content, biscuits typically include salt in an amount of 0.8% to 1.2% by weight, bread typically includes salt in an amount of 1.0% to 2.0% by weight and cinnamon rolls typically include salt in an amount of 0.4% to 1.2% by weight. These amounts are based on the use of table salt. Since the present invention enables salt content reductions of as much as 70%, the salt content of biscuits, bread and cinnamon rolls produced in accordance with the present invention can be as low as 0.24%, 0.3%, or 0.12% by weight for the biscuits, bread, and cinnamon rolls, respectively. Preferably, the salt content reduction is at least 30% such that, for example, the salt content of biscuits is reduced from 0.8% or 1.2% by weight to less than 0.56% or 0.84% by weight.

FIG. 1 shows a graph illustrating a relationship between approximate dissolution rate and the amount of salt reduction that can be achieved relative to the amount of table salt required to achieve the same saltiness perception level. The graph is based on table salt having a dissolution rate of about 60 seconds. Since the graph shows the reduction in the amount of salt used relative to the amount of table salt that would be used, there is of course a 0% reduction when using salt having a dissolution rate of 60 seconds. In contrast, when salt granules having a dissolution rate of about 148 seconds are used, a salt content reduction of roughly 40% is achieved (relative to the salt content when table salt is used). Similarly, when salt particles having a dissolution rate of about 155 seconds are used, a salt content reduction of approximately 60% is achieved. When salt particles having a dissolution rate of about 178 seconds are used, a salt content reduction of approximately 65% is achieved. Using the graph of FIG. 1, it was determined that, for a given level of salty flavor perception, the dissolution rate/salt content reduction relationship generally conforms to Equation 1, where y is the dissolution rate in seconds and x is the percent reduction in salt content as compared with the amount of table salt typically used:

$$y = 78.04 + 1.575x \quad \text{(Equation 1)}$$

Figure 2:
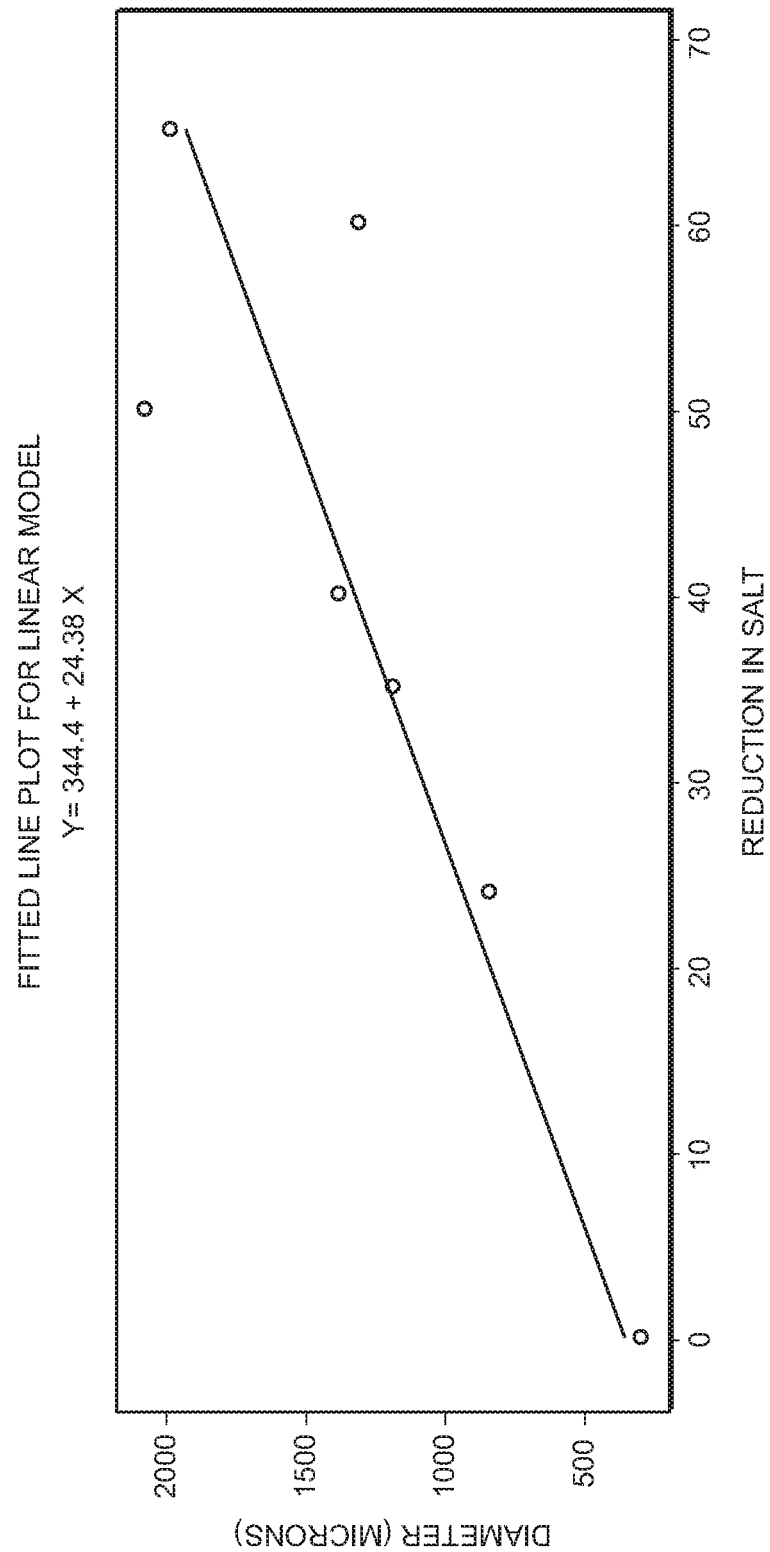
FIG. 2 is a graph of the relationship between average salt particle size and salt content reduction.

In some embodiments, a salt can be selected by size in order to arrive at the desired salt reduction goal. Generally, as the particle size increases, the salt content can be decreased without any reduction in salty flavor perception. The graph is based on table salt having an average particle size of 335.5 microns. Since the graph shows the reduction in the amount of salt used relative to the amount of table salt that would be used, there is of course a 0% reduction when using salt having an average particle size of 335.5 microns. In contrast, when salt granules having an average particle size of 1000 microns are used, a salt content reduction of roughly 30% is achieved (relative to the salt content when table salt is used). Similarly, when salt granules having an average particle size of 2000 microns are used, a salt content reduction of greater than 60% is achieved. Using the graph of FIG. 2, it was determined that, for a given level of salty flavor perception, the particle size/salt content reduction relationship generally conforms to Equation 2, where y is the particle size in microns and x is the percent reduction in salt content as compared with the amount of table salt typically used:

$$y = 344.4 + 24.38x \quad \text{(Equation 2)}$$

Encapsulation can add 10% to 35% to the salt content reduction achieved. In other words, an encapsulated salt of a given particle size or unencapsulated dissolution rate will provide a salt content reduction 10% to 35% greater than would be expected for the same salt that is not encapsulated. Table 1 provides a few salt types along with their expected dissolution rates, measured diameters and salt content reductions.

TABLE 1

| Salt Type | Dissolution rate (seconds) | Diameter (microns) | Salt Content Reduction (relative to table salt) |
|---|---|---|---|
| Encapsulated Pretzel | | 1920 | 70% |
| Coarse Pretzel | 178 | 1990 | 65% |
| Medium Pretzel | 155 | 1310 | 60% |
| Sea Salt | | 2080 | 50% |
| Rock Salt | 148 | 1380 | 40% |
| Encapsulated Table Salt | | 570 | 35% |

Depending on the particular application, any of the salts included in Table 1 can be used in accordance with the present invention. Currently though, the medium pretzel salt is considered to be the preferred salt type for use in a packaged frozen biscuit dough.

A dough or batter composition can include one or more types of flour (e.g., wheat, oat, barley, lentil, soy, quinoa, vegetable, or other flour, or a combination thereof) in an amount of 15 to 50 weight percent flour based on the total weight of the dough composition (i.e., all dough ingredients). Alternatively, a flour replacement ingredient can be used to replace a portion of the flour. Generally, a dough contains from about 40% to about 50% by weight flour, while a batter contains from about 15% to about 30% flour.

Water is included in a dough or batter to provide desired rheology. Water can be added during processing in the form of ice to control the dough temperature during processing (the amount of any such water used being included in the amount of liquid components). The precise amount of water depends on factors known to those skilled in the dough and batter making art including, for example, whether a dough composition is a developed or underdeveloped composition. Water (from all sources) can be present in the dough composition in an amount of 15 weight percent or greater. In developed compositions, the amount of water from all sources (e.g., water, eggs, milk, etc.) should not be so high that the dough composition becomes soft and cannot maintain its desired closed-cell structure including bubbles of carbon dioxide and water vapor. Also, the amount of water should not be so low that the dough composition is dry and has no ability to expand. Alternatively, the dough composition can be a dry mix in which case the dough composition contains all dough ingredients other than the water (or other liquid component).

A dough or batter composition can also include other components, such as fat, milk, eggs, or any combination of these. A dough or batter composition can include fat in the form fat particles, plastic fat, liquid fat (oil) or a combination of these different types of fat. The amount of total fat in the dough or batter composition can be any appropriate amount based on the type of dough or batter composition being prepared, with exemplary amounts being in a range from 1 weight percent to 40 weight percent based on the total weight of the dough composition. The fat component can be derived from any source, such as vegetable, dairy and marine sources including butter oil or butterfat, soybean oil, corn oil, rapeseed or canola oil, copra oil, cottonseed oil, fish oil, safflower oil, olive oil, sunflower oil, peanut oil, palm oil, palm kernel oil, coconut oil, rice bran oil and other plant derived oils, such as vegetable or nut oils. Examples of shortenings include animal fats, such as lards, butter and hydrogenated vegetable oils, such as margarine. Mixtures of different fats may also be used as the fat component.

A dough or batter composition can be caused to expand (i.e., leaven) by any leavening mechanism known in the art including entrapped gas, chemical leavening agents or biological agents (e.g., yeast). Thus, the leavening agent can be: an entrapped gas, such as layers or cells (i.e., bubbles) that contain carbon dioxide, water vapor, oxygen, etc.; a chemical leavening system, such as a basic chemical leavening agent and an acidic chemical leavening agent that react to form a leavening gas (e.g., carbon dioxide); or any type of yeast, such as cake yeast, cream yeast, dry yeast, etc. The amount of yeast in a dough composition can be an amount that will produce a desired volume of gaseous metabolites. Exemplary amounts of yeast ingredient used in the dough composition can be up to 10 weight percent (measured on a wet basis, including water associated with a yeast ingredient). For developed dough compositions, the yeast ingredients are 2 to 8 weight percent, and, for underdeveloped dough compositions, the yeast ingredients are less than 1 to 5 weight percent. Chemical leavening agents can optionally be present in minor amounts, preferably less than 10 weight percent chemical leavening agent based on the total weight of yeast and chemical leavening agent, or may not be present at all.

Acidic chemical leavening agents (or acid agents) include those generally known in the dough and bread-making arts.

Acidic agents can be relatively soluble within different temperature ranges and can be optionally encapsulated. Examples of acidic agents include sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dehydrate (DCPD) and glucono-delta-lactone (GDL). A dough composition may can include basic chemical-leavening agent, optionally encapsulated. Basic chemical leavening agents are known in the dough and bread-making arts and include soda (i.e., sodium bicarbonate, $NaHCO_3$), potassium bicarbonate ($KHCO_3$), ammonium bicarbonate ($NH_4HCO_3$), etc. Encapsulating the basic chemical leavening agent provides separation between the basic agent and the bulk of the dough composition. If present, exemplary amounts of chemical leavening agent can be less than 5 weight percent of a dough composition, although other amounts can also be useful depending on the dough formulation and desired baked dough properties.

A dough or batter composition can optionally include one or more sweeteners, which can be natural or artificial and liquid or dry. Examples of suitable dry sweeteners include lactose, sucrose, fructose, dextrose, maltose, corresponding sugar alcohols and mixtures thereof. Examples of suitable liquid sweeteners include high fructose corn syrup, malt and hydrolyzed corn syrup. If a liquid sweetener is used, the amount of other liquid components can be adjusted accordingly. Generally, dough or batter compositions include up to 8 weight percent sweetener. A dough or batter composition can also optionally include additional flavorings, such as whey, malt, yeast extract, inactivated yeast, spices, vanilla, natural and artificial flavors, etc. The additional flavoring can be included in an amount in the range from 0.1 weight percent to 10 weight percent of the dough composition. Additionally, a dough or batter composition can optionally include particulates, such as raisins, currants, fruit pieces, nuts, seeds, vegetable pieces and the like in suitable amounts. A dough or batter composition can optionally include other additives, colorings and processing aids, such as gliadin (e.g., less than 1 weight percent to improve extensibility in underdeveloped dough) and emulsifiers include lecithin, diglycerides, polyglycerol esters and the like (e.g., diacetylated tartaric esters of monoglyceride (DATEM) and sodium stearoyl lactylate (SSL)).

It was further discovered that packaged doughs provided herein can have at least one improved shelf life characteristic as compared to compared to control packaged doughs containing salt at higher levels and including salt with a dissolution rate of 100 seconds or less (e.g., table salt). Without being bound to theory, it is believed that the freezing point of a packaged dough provided herein is higher than doughs with a higher salt content. Because the freezing point is increased, enzyme activity responsible for graying of packaged refrigerated or frozen doughs is suppressed. In addition, a higher freezing point reduces the chemical reaction of leavening agents with free water, and thus, leavening during cooking can be improved over packaged doughs with higher salt content.

A packaged dough provided herein can have at least one shelf life characteristic that is improved over a packaged dough with a higher salt content. In one embodiment, a packaged dough has an improved shelf life characteristic if it has a visually reduced amount of gray coloration at any point during a shelf life at 10° F. over a period of 8 weeks as compared to a packaged dough having a higher salt concentration at the same time point and stored under the same conditions. In some embodiments, a packaged dough has an improved shelf life characteristic if it has an increased Minolta Gray Scale Measurement (Konica Minolta Chroma Meter, Hunter "L" value, measured according to manufacturer instructions, Konica Minolta, Osaka, Japan) (e.g., having a Hunter "L" value at least 2% higher) at any point during a shelf life at 10° F. over a period of 8 weeks as compared to a packaged dough having a higher salt concentration at the same time point and stored under the same conditions.

In another embodiment, a packaged dough has an improved shelf life characteristic if it has a significantly increased bake specific volume after a shelf life of 5 weeks at 10° F. as compared to a packaged dough having a higher salt concentration at the same time point and stored under the same conditions.

Additional benefits can be obtained by modifying packaged dough and/or packaged cooked dough- or batter-based foods to include less salt using the discovery described herein. Reduced salt content can aid in mixing the dough ingredients, and, in certain embodiments, manufacturing costs are reduced due to the lower salt content. For frozen packaged doughs or frozen cooked dough- or batter-based foods, additional benefits include products that 1) freeze more quickly during manufacture; and 2) are less likely to thaw in transit (or can be transported at a warmer temperature). In some embodiments, the freezing/thawing temperature of dough is expected to be 5-10° F. higher than for equivalent dough made with i.e. a higher amount of table salt.

Figure 3:
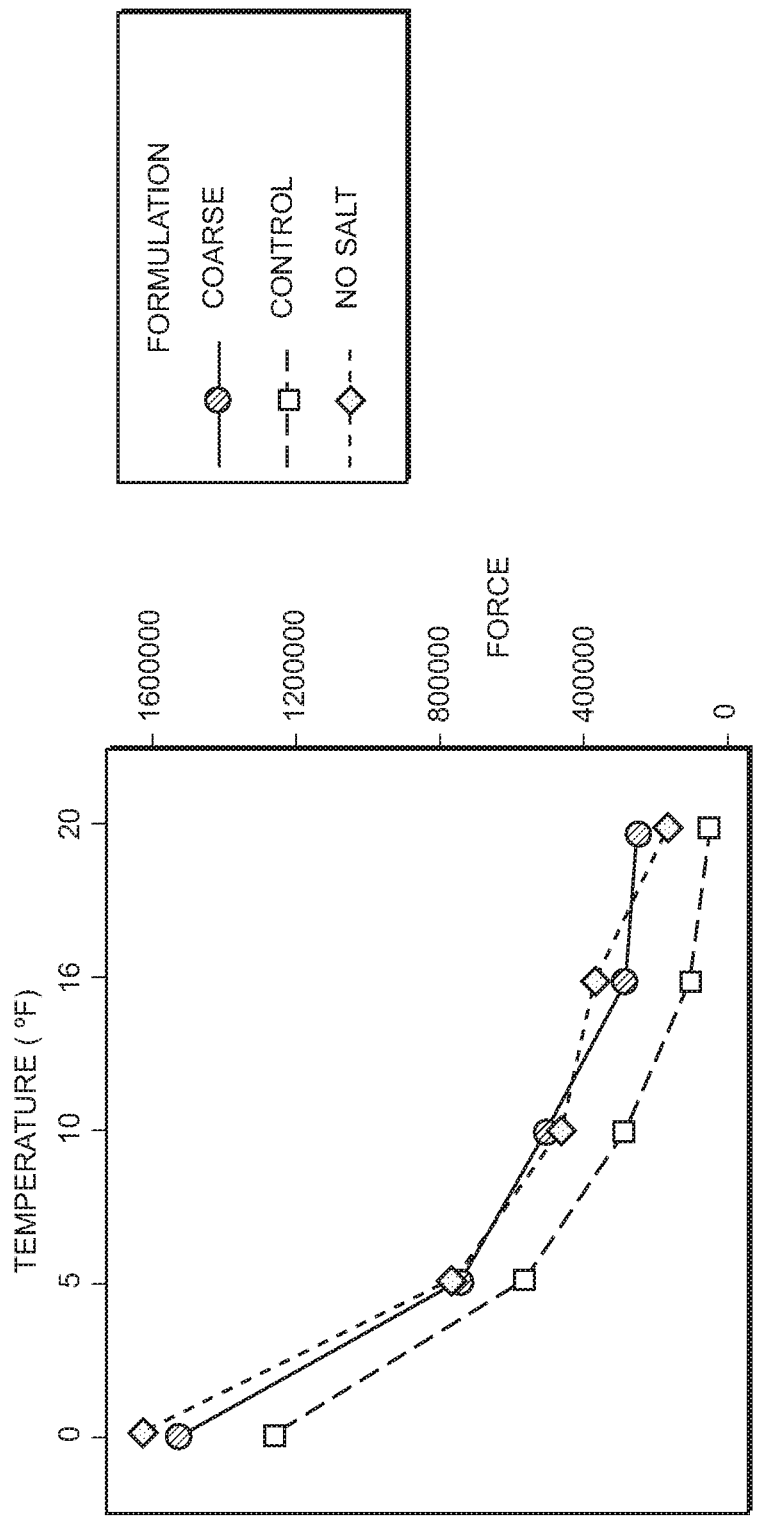
FIG. 3 is a graph showing the force required to penetrate different biscuit formulations at temperatures ranging from 0 to 20° F.
Figure 4:
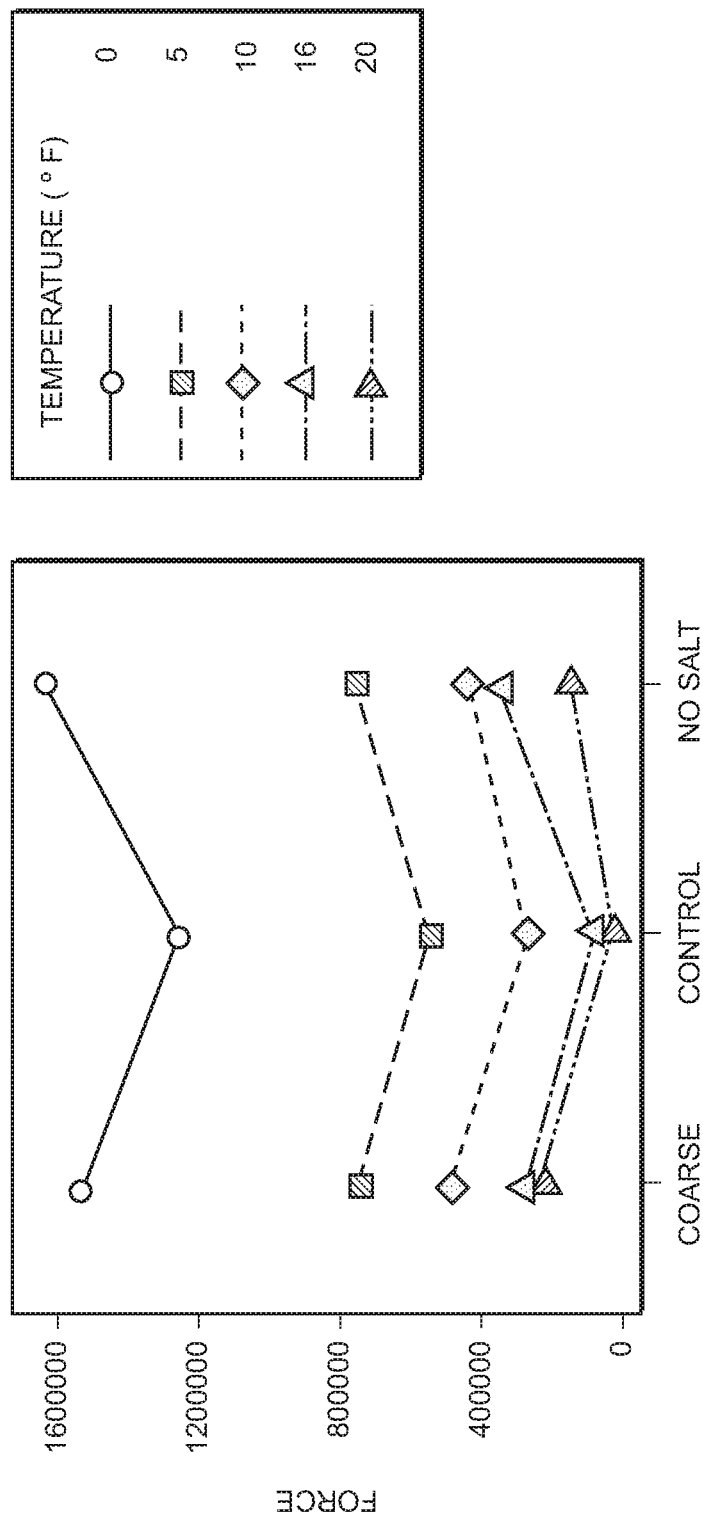
FIG. 4 is another graph showing the force required to penetrate different biscuit formulations at temperatures ranging from 0 to 20° F.

In fact, when tested, frozen biscuit dough made with reduced salt content and with salt that has an increased dissolution rate in accordance with the invention appeared to behave as though they contained no salt at all. Specifically, frozen biscuit dough having different formulations were tested with a texture analyzer to measure the force needed to penetrate the biscuits at temperatures from 0 to 20° F. As shown in FIGS. 3 and 4, it was found that the results for frozen biscuit dough made with salts expected to have a dissolution rate of about 148-178 seconds generally matched those of frozen biscuit dough containing no salt, which represents a significant improvement over biscuits made with table salt.

In order to prepare a dough or batter provided herein, an appropriate selection of dough ingredients, including salt particles having a dissolution rate of at least 120 seconds, is mixed together to form a dough or batter composition. Where the salt particles are included at the beginning of mixing or the dough or batter is subjected to a longer or more vigorous mixing procedure, salt with a higher dissolution rate (e.g., at least 140 seconds) may be considered. Alternatively, where salt is added nearer the end of mixing, or the dough or batter is mixed for a shorter period of time or under less vigorous mixing conditions, salt with a lower dissolution rate (e.g., at least 120 seconds) can be used. As a result, at least some percentage (e.g., at least 10% or at least 15%) of salt particles are at least partially undissolved at the end of mixing.

In some embodiments, a dough provided herein is formed into pieces, such as biscuit- or loaf-shaped pieces, and packaged for storage as a raw dough in either a refrigerated or frozen state. Preferably, if a dough is packaged for storage in a frozen state, the dough pieces are frozen within 18-20 minutes of forming the dough composition into pieces. If a dough is packaged for storage as a raw dough, the salt may dissolve during storage, but remain in relatively discrete pockets of high salinity through storage and cooking, or dissolve upon cooking.

In some embodiments, a dough or batter is portioned and at least partially cooked (e.g., baked or par baked) prior to packaging. Salt in a cooked dough- or batter-based food product dissolves after mixing, before or during baking, but remains in relatively discrete pockets of high salinity.

As noted above, reducing the amount of salt has a beneficial effect on the freezing/thawing temperature of a dough-based food product. To quantify this reduction, X-ray micro-computed tomography ("micro-CT") was used to evaluate the structure of frozen biscuit dough samples, particularly a control sample containing standard-sized salt and a sample containing coarse salt. The results are provided below in Table 2.

TABLE 2

|  | Control (Table salt) | Coarse Pretzel Salt |
|---|---|---|
| Volume of Dough (mm$^3$) | 3182.93 | 1838.83 |
| Salt (% by weight) | 0.92 | 0.37 |
| Number of Salt Particles Added to Dough per mm$^3$ | 73.28 | 2.569 |
| Number of Salt Particles in Dough After Mixing, Forming, and Freezing per mm$^3$ | 0.05 | 0.45 |
| Salt Particles Remaining After Mixing (%) | 0.068 | 17.527 |

Based on Table 2, it can be seen that, when table salt with a dissolution rate of about 60 seconds is used in a biscuit dough, the salt is almost entirely dissolved after processing (i.e., after the dough is formed into pieces and frozen, but before cooking). In contrast, when coarse salt with a dissolution rate of about 178 seconds is used in accordance with the invention, more than 15% of the salt remains undissolved after processing. In some embodiments, a dough or batter can have at least 10% of the included salt remain undissolved after mixing.

In combination with the overall salt content reduction, this reduction in dissolved salt results in biscuits having a higher freezing/thawing temperature such that biscuit dough pieces freeze more quickly during manufacture, are less likely to thaw in transit and have an increased shelf life. The higher temperature ties up more water in the biscuits. In addition, the existence of salty ice in the frozen biscuits minimizes color changes and leavening reaction, preventing undesirable graying over time and reducing undesired reaction of leavening agents with water so as to improve shelf life characteristics.

Although the present invention has been discussed in connection with frozen biscuit dough, a variety of packaged dough products with extended shelf lives, as well as packaged cooked dough- or batter-based food products, both frozen and non-frozen, can be prepared in accordance with the present invention. For example, frozen and non-frozen packaged bread dough, scone dough, pizza dough, and the like can be prepared. In another example, frozen and non-frozen packaged cooked breads, crusts, scones, pancakes, cakes, and rolls can be prepared. In connection with the present invention, "frozen" products are those products that are frozen at some point prior to sale, e.g., during manufacture, transit or display for sale. While non-frozen products do not benefit from the increase in freezing/thawing temperature, the other advantages remain, such as the salt content reduction.

Detailed embodiments of the present invention are disclosed herein. However, it is to be understood that the disclosed embodiments are merely exemplary of the invention that may be embodied in various and alternative forms.

Therefore, specific structural and functional details disclosed herein are not to be interpreted as limiting, but merely as a representative basis for teaching one skilled in the art to employ the present invention. Additionally, when a value of a property is specified, the value is intended to encompass a range of values +/−5%. When the modifier "about" is used, the range is increased to +/−10%. For example, specifying a size of "1,000 microns" includes the range from 950 microns to 1050 microns, and "about 1,000 microns" includes the range from 900 microns to 1,100 microns.

Based on the above, it should be readily apparent that the present invention provides a food product having a reduced salt content without any reduction in salt flavor and with an increase in freezing temperature. Although described with reference to preferred embodiments, it should be readily understood that various changes or modifications could be made to the invention without departing from the spirit thereof. In general, the invention is only intended to be limited by the scope of the following claims.

The invention claimed is:

1. A method of producing a packaged dough having a shelf life of over a period of 8 weeks at 10° F. and formulated to produce a baked good when baked, wherein the baked good has a saltiness perception level substantially the same as compared to a first control baked good produced from a first control dough having the same formulation as the packaged dough, with the exception of the first control dough having salt particles with a dissolution rate of 100 seconds or less and containing at least 40% more salt particles by weight than the packaged dough, the method comprising:
   a. mixing flour, water, and encapsulated or unencapsulated salt particles, wherein, with unencapsulated salt particles, the unencapsulated salt particles have a dissolution rate of 120 seconds to 200 seconds and, with encapsulated salt particles, the encapsulated salt particles are salt particles encapsulated with a material in order to modify the dissolution rate of the salt particles to a dissolution rate of 120 seconds to 200 seconds, to form a dough having at least 10% of the salt particles being at least partially undissolved and having dissolved salt that is non-homogeneously distributed throughout the dough, wherein the dough has a salt content of less than 0.84% by weight;
   b. forming the dough into pieces;
   c. packaging the dough pieces; and
   d. storing the packaged dough pieces, including the at least partially undissolved and dissolved salt, in a frozen state.

2. The method of claim 1, wherein the baked good is a biscuit, scone, bread, pizza crust, dinner roll, or sweet roll.

3. The method of claim 1, wherein the baked good has a visually reduced amount of gray coloration over the shelf life compared to a first control baked good produced from a first control dough having the same formulation as the packaged dough, with the exception of the first control dough having salt particles with a dissolution rate of 100 seconds or less and containing at least 40% more salt particles by weight than the packaged dough.

4. The method of claim 1, wherein the baked good has a Hunter "L" value at least 2% higher over the shelf life compared to a first control baked good produced from a first control dough having the same formulation as the packaged dough, with the exception of the first control dough having salt particles with a dissolution rate of 100 seconds or less and containing at least 40% more salt particles by weight than the packaged dough.

5. The method of claim 1, wherein the baked good has an increased bake specific volume after a shelf life of 5 weeks at 10° F. compared to a first control baked good produced from a first control dough having the same formulation as the packaged dough, with the exception of the first control dough having salt particles with a dissolution rate of 100 seconds or less and containing at least 40% more salt particles by weight than the packaged dough.

6. The method of claim 1, wherein the salt particles are unencapsulated and have an average particle size of 1000 microns to 2000 microns.

7. The method of claim 6, wherein the salt particles comprise a medium pretzel salt or a coarse pretzel salt.

8. The method of claim 1, wherein the salt particles are encapsulated salt particles.

9. The method of claim 1, wherein the first control dough contains more than 50% more salt particles by weight than the packaged dough.

10. The method of claim 8, wherein the encapsulated salt particles include salt particles encapsulated with a lipid, a wax or a carbohydrate.

11. The method of claim 8, wherein the encapsulated salt particles have an average particle size of at least 500 microns.

12. The method of claim 9, wherein the first control dough contains at least 100% more salt particles by weight than the packaged dough.

13. The method of claim 12, wherein the first control dough contains at least 200% more salt particles by weight than the packaged dough.

\* \* \* \* \*